United States Patent [19]

Hofmann

[11] Patent Number: 5,196,662
[45] Date of Patent: Mar. 23, 1993

[54] ELECTRIC STEERING COLUMN SWITCH FOR MOTOR VEHICLES

[75] Inventor: Georg Hofmann, Heilbronn-Horkheim, Fed. Rep. of Germany

[73] Assignee: SWF Auto-Electric GmbH, Fed. Rep. of Germany

[21] Appl. No.: 466,388
[22] PCT Filed: Aug. 11, 1989
[86] PCT No.: PCT/EP89/00952
§ 371 Date: Sep. 19, 1991
§ 102(e) Date: Sep. 19, 1991
[87] PCT Pub. No.: WO90/02411
PCT Pub. Date: Mar. 8, 1990

[30] Foreign Application Priority Data

Aug. 27, 1988 [DE] Fed. Rep. of Germany ....... 3829109

[51] Int. Cl.$^5$ .................. H01H 9/00; H01H 21/50; B60Q 1/42
[52] U.S. Cl. ................................. 200/61.54
[58] Field of Search ................ 200/61.27–61.38, 200/61.54

[56] References Cited

U.S. PATENT DOCUMENTS

| | | | |
|---|---|---|---|
| 4,328,431 | 5/1982 | Usami | 307/10 R |
| 4,414,442 | 11/1983 | Berginski et al. | 200/61.27 |
| 4,791,253 | 12/1988 | Erdelitsch et al. | 200/61.27 |
| 4,882,457 | 11/1989 | Erdelitsch et al. | 200/61.54 |

FOREIGN PATENT DOCUMENTS

| | | |
|---|---|---|
| 231924 | 8/1987 | European Pat. Off. |
| 2349886 | 4/1976 | Fed. Rep. of Germany |
| 3211672 | 10/1983 | Fed. Rep. of Germany |
| 3304942 | 8/1984 | Fed. Rep. of Germany |

Primary Examiner—J. R. Scott
Attorney, Agent, or Firm—Robert P. Seitter; J. Gordon Lewis

[57] ABSTRACT

An electric steering column switch for motor vehicles which includes a switching member pivotally mounted for pivotal movement about a pivot axis between predetermined positions. The switching member includes a locking cam that engages a locking lever which is mounted for swivelling movement with respect to the switching member. The locking lever has switch cams that correspond to the predetermined positions of the switching member and receive the locking cam to hold the switching member in one of the predetermined positions. A spring biases against the locking lever urging the lever in the direction of the locking cam. The spring is mounted to the switching member so that the spring pivots with the switching member and the locking cam. In this way, the spring applies consistent pressure against the locking lever and the adjacent locking cam.

17 Claims, 3 Drawing Sheets

ELECTRIC STEERING COLUMN SWITCH FOR MOTOR VEHICLES

BACKGROUND OF THE INVENTION

The present invention relates to an electric switch comprising a switching member rotatably located in a housing between several switching positions. The invention is particularly directed to a steering column switch for motor vehicles.

In electric switches the switching positions of a switching member, particularly if the switching member has more than two switching positions, are largely determined by a switch cam and a locking cam lying on the switch cam. Usually the switch cam is fixed to the housing, whereas the locking cam is guided in a receiver of the switching member and is resiliently supported on the switching member. By means of such locking systems it is difficult to perform switching function without noise and without play in the switching positions of the switching member, because noises are immediately transferred to the switch housing and the locking cam in the switching member is guided with play.

Therefore locking systems with locking levers swivelably located in the housing against the force of resilient means are known and have been used in the art. The switch cam or the locking cam is arranged on the locking lever, the counter-part is in a stationary manner formed onto the switching member. The locking lever can be located in the housing to a large extent without play. This particularly can be achieved, if it comprises a film hinge connecting a swivelable section of the locking lever with the fastening section and producing a swiveling axis of the locking lever. In a locking system with a locking lever of the type described above, switching with less noise results.

From German patent document DE-PS 32 11 672 an electric switch is known in which the switch cam is on the switching member and the locking cam is in the locking lever. In this electric switch it is a disadvantage in that for the switching member in the area of the switch cam, substantial space is needed in the switching housing, which space is not always available.

An electric switch with the features according to which the switch cam is on the locking lever and the locking cam is on the switching member is shown in German patent document DE-OS 36 03 820. As to the switch of the type described herein a certain point of the back of the locking lever is supported on a leaf spring fixed to the housing. As to such an electric switch only minimal space on the switching member is needed for the locking cam. However, it is known from experience that the switching characteristics of the locking system change especially under the influence of elevated ambient temperature. Furthermore different switching moments may be experienced between the different switching positions.

It is therefore an object of the present invention to improve the locking system of an electric switch of the general type described herein.

SUMMARY OF THE INVENTION

According to the invention this object is achieved by means of an electric switch comprising the features described herein and in which, in addition, the resilient means can be moved along the locking lever together with the locking cam upon switching the switching member. Thus in an electric switch of this type upon switching, both the locking cam and the resilient means are moved in relation to the locking lever and the switching moments between the different switching positions are adapted to each other in a convenient manner.

It is advantageous if the resilient means act upon the locking lever at least approximately at the same distance as the distance of the locking cam from the swiveling axis of the locking lever. Thus it is achieved that in the different switching positions the different lengths of the levers no longer affect the switching moments. Since the locking lever is supported just at the point the locking cam presses onto it, the locking cam no longer bends the locking lever so that the locking lever keeps its form even under the influence of elevated temperature and the switching characteristics of the locking system remain the same.

In a preferred embodiment the resilient means are held on the switching member in such a way that upon switching the switching member they are taken along with the switching member. Thus the switching member, which in any event is moved upon each switching, is used to move the resilient means. It is of an advantage that the resilient means on the one hand acting upon the locking lever, are supported on the switching member. Since the resilient means push the locking lever against the locking cam, since indeed they are supported at both sides on the switching member, they do not press any longer onto the bearing point of the switching member. It is advantageous if the switch cam is on the side of the locking lever turning away from the bearing point of the switching member, if the switching member grips the locking lever by means of the locking cam and if the resilient means are arranged on the side of the locking lever facing the bearing point of the switching member. Thus the resilient means are arranged in a minimal space.

In order to alter the force exerted by the resilient means from one switching position to another the point the resilient means act upon the locking lever is moved on a circle upon swiveling the switching member between at least two adjacent switching positions, the center of which circle is on the axis of rotation of the switching member in the two switching positions. Since the locking lever is also swiveled about an axis, when swiveling the switching member, the center of the circle is displaced with respect to the axis of rotation of the switching member during the swiveling movement. Preferably the locking lever comprises a cylindrical contact area for the resilient means. In the two switching positions the axis of this cylindrical contact area is then identical with the axis of rotation of the switching member. Advantageously the resilient means preferably are formed by a helical spring which is in a bottom bore of the switching member.

BRIEF DESCRIPTION OF THE DRAWING

Two embodiments of an electric switch according to the present invention will now be described in greater detail in conjunction with the accompanying drawing wherein.

DETAILED DESCRIPTION

Figure 1:
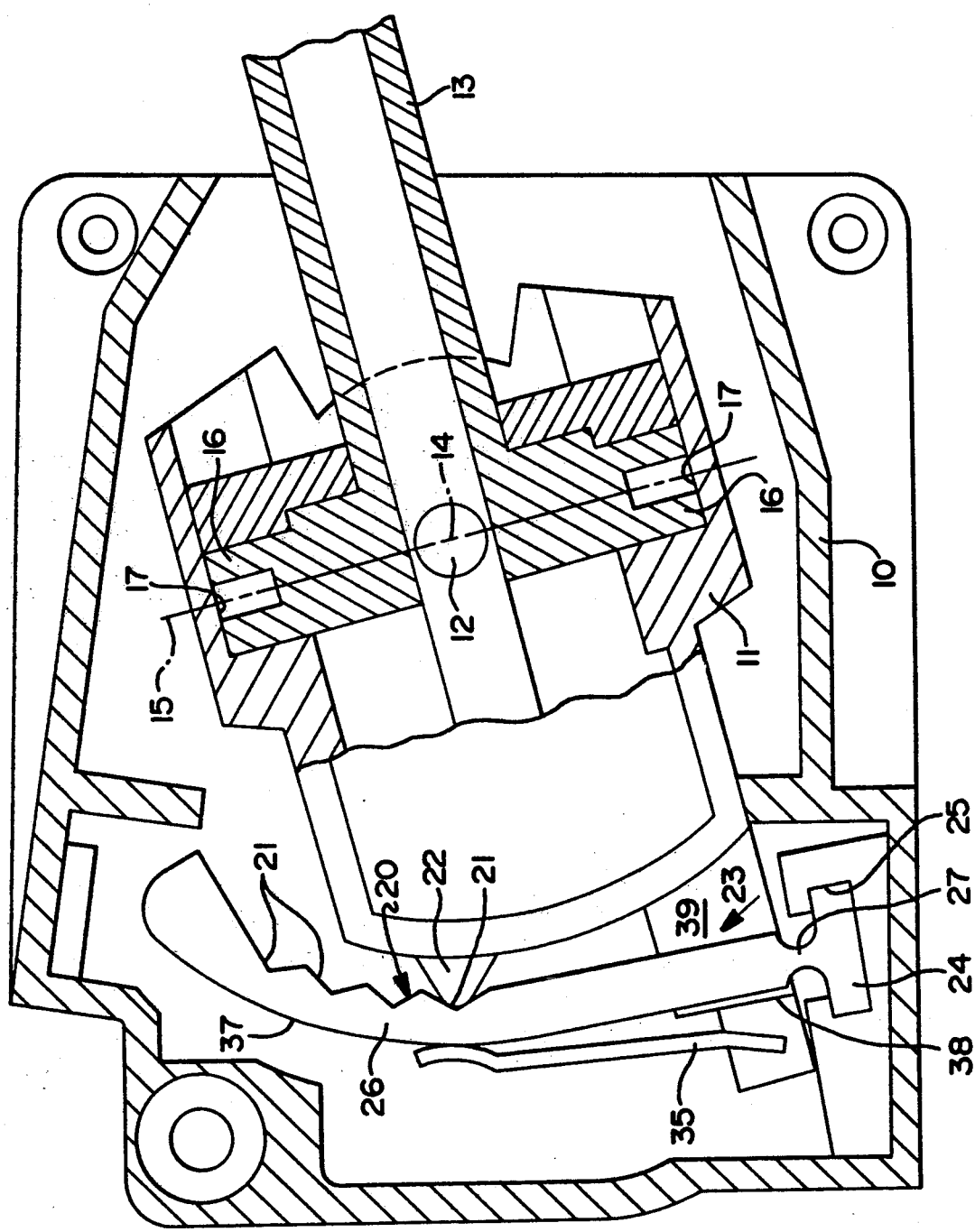
FIG. 1 is the first embodiment in which the locking lever is supported on a leaf spring fixed onto the switching member.
Figure 2:
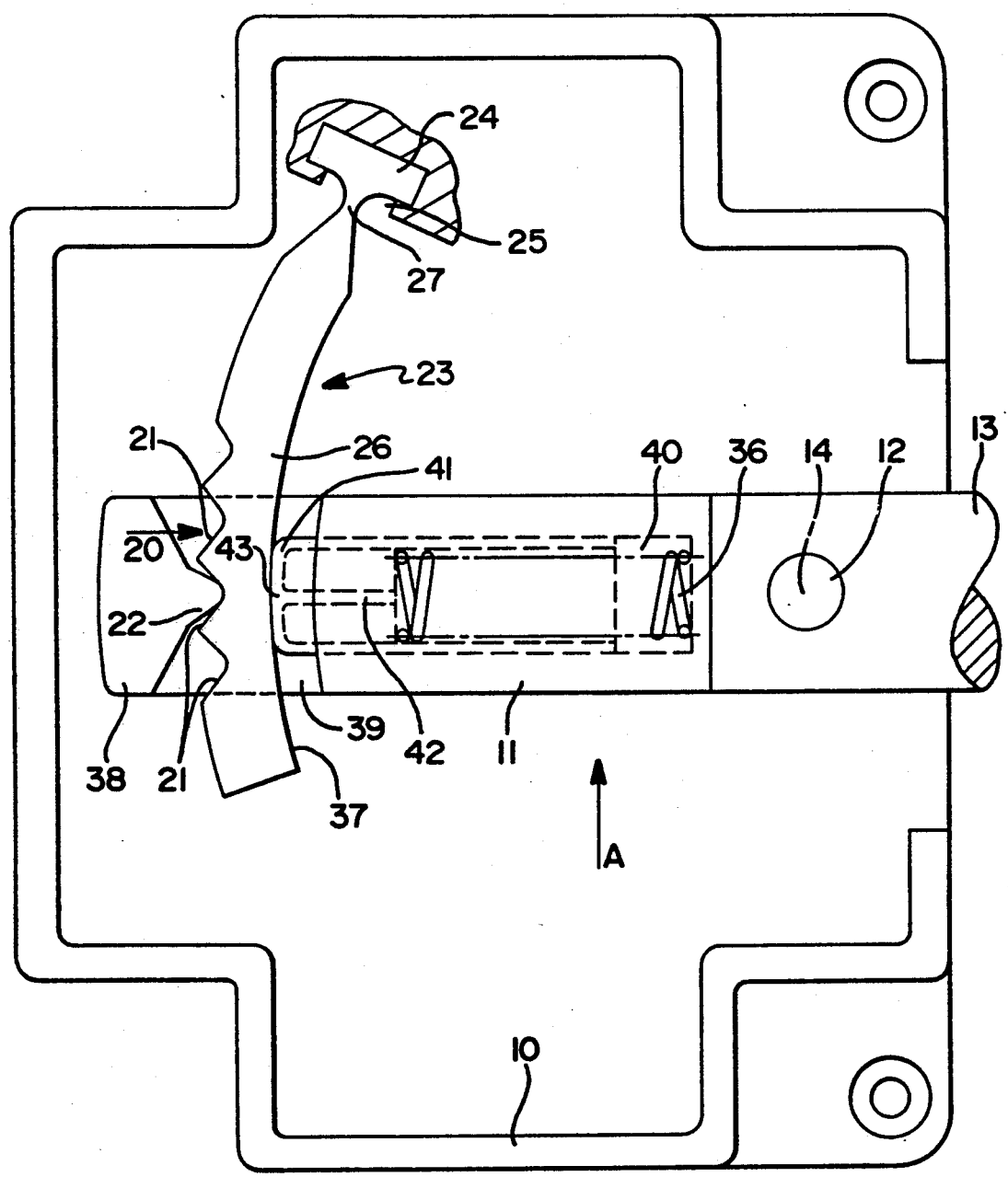
FIG. 2 is the second embodiment in which the locking lever is supported on a helical pressure spring which is arranged in the switching member between the locking lever and the bearing point of the switching member; and, FIG. 3 is a view in the general direction of arrow A of FIG. 2.

The switches illustrated in the figures comprise a housing 10 in which a switching member 11 is located by way of bearing pins 12 in such a way that it can be swiveled about an axis by means of a switching lever 13 in the drawing plane according to FIGS. 1 and 2. The switching lever 13, as in the embodiment according to the FIGS. 2 and 3, can integrally be formed with the switching member 11. However, it also can be a second component, as in the embodiment according to FIG. 1, that, with respect to the switching member, can be swiveled around an axis 15 penetrating the axis 14 of the bearing pins 12 in a perpendicular direction. For this purpose the embodiment according to FIG. 1 the switching lever 13 is located in two bearing receivers 17 of the switching member 11 by means of two bearing pins 16.

With respect to the axis 14 the switching member 11 of the switches illustrated can occupy four locking positions, that is, four stable switching positions between which the switching member is only switched under the influence of an outer force. The four switching positions are determined by a switch cam 20 comprising four pointed indents 21 and by a locking cam 22 which is integrally formed with the switching member 11, which engages into one of the indents 21 in each switching position and which upon switching, enters one indent after the other while moving along the switch cam 20. The switch cam 20 is located on a locking lever 23 substantially comprising three sections. A first section 24 of the locking lever 27 is stationarily located in a receiver 25 of the housing 10. A second section 26 is provided with the switch cam 20 and is connected with the fastening section 24 by way of a film hinge 27 which is considered as a third section. Thus, due to the film hinge 27 the section 26 can be swiveled about an axis with respect to the fastening section 24. More precisely, the locking lever 23 is arranged in such a way that its section 26 can be swivelled about an axis in a plane that is perpendicular to the axis 14 of the switching member 11.

Figure 3:
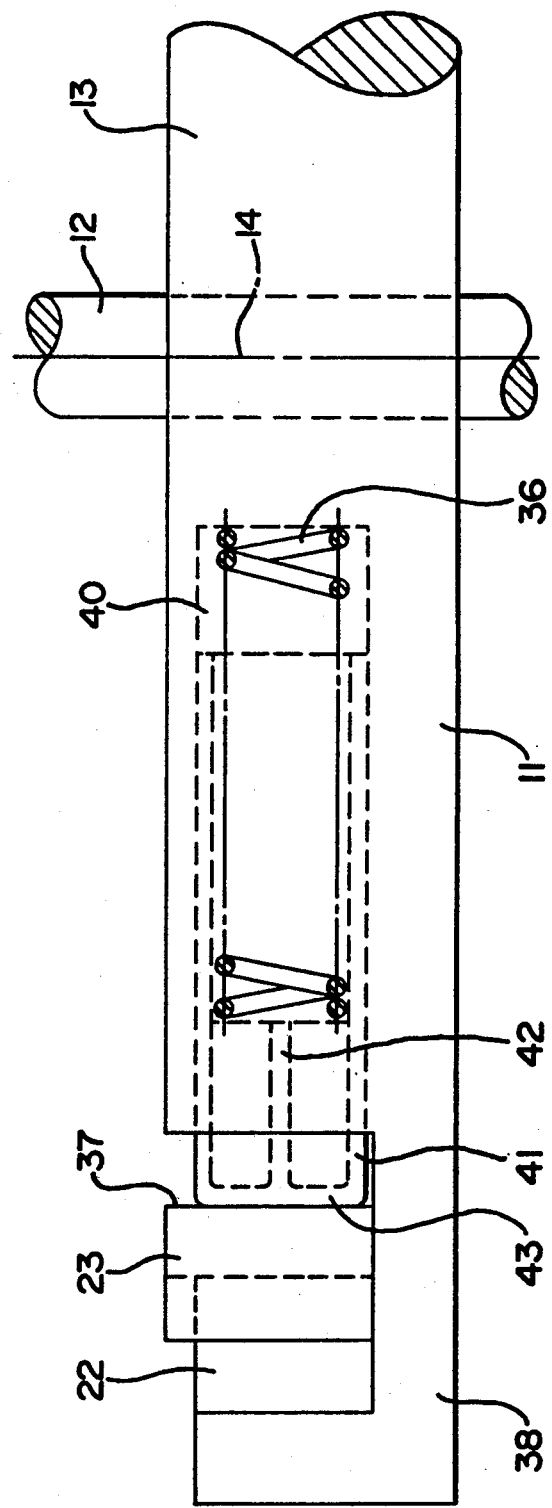

As to the embodiment according to FIG. 1 the swivelable section 26 of the locking lever 23 is pushed against the locking cam 22 of the switching member 11 by a leaf spring 35 and in the embodiment according to the FIGS. 2 and 3 it is pushed by a helical spring 36.

In the FIGS. 1 and 2 the locking cam 22 is situated in an indent 21 of the switch cam 20. Thus the switching member 11 and the switching lever 13 occupy a stable switching position with respect to the axis 14. Upon switching the locking cam 22 moves along the switch cam 20 and thereby pushes the locking lever 23 away against the force of the spring 35 or 36 until it has overcome or overrides the top between two indents 21. Then, the locking cam 22 automatically enters the next indent 21 due to the force of the spring 35 or 36 and thereby positions the switching member 11 with it.

As it can be seen in FIGS. 1 and 2, the spring 35 or 36 of those embodiments lies on the back 37 of the locking lever 23 turning away from the switch cam 20 and just opposite the locking cam 22. The points the locking cam 22 and spring 35 or 36 act upon are thus at the same distance of the film hinge 27 and thus of the swiveling axis of the locking lever 23. The film hinge 27 and fastening section 24 are thus free of force. The respective orientation between the locking cam 22 and spring 35 or 36 is not changed even when switching the switching member 11, for the spring 35 or 36 is arranged and held on the switching member 11 and, upon switching, is moved together with the locking cam 22 along the back 37 of the locking lever 23.

In the different switching positions of the switching member 11, the locking lever 23 always occupies the same position in the housing 10. The back 37 of the locking lever 23 is formed by a cylindrical area in the section in which the spring 35 or 36 glides along on it. In the different switching positions of the switching member 11 the axis of the cylindrical area is identical with the axis of rotation 14 of the switching member 11 in the positions occupied by the locking lever 23. Thus the spring 35 or 36 is tensioned to the same extent in each switching position of the switching member 11.

As to the embodiment according to FIG. 1, the switch cam 20 is on the side of the locking lever 23 facing the swiveling axis 14 of the switching member 11. The locking cam 22 is turned away from the axis of rotation 14. The switching member 11 has a stud 38 that extends beyond the locking lever 23 which is provided with an indent 39 penetrated by the locking lever 23. Viewed from the axis of rotation 14, beyond the locking lever 23 the one end of the leaf spring 35 is inserted into the stud 38. The leaf spring 35 extends from the fastening point along the locking lever 23 up to the point it lies on the back 37 of the locking lever 23.

As to the embodiment according to the FIGS. 2 and 3 the switch cam 20 is on the side of the locking lever 23 turned away from the axis of rotation 14 of the switching member 11. The switching member 1 has a stud 38 provided with an indent 39 for the locking lever 23, which stud, however, carries the locking cam 22 pointing towards the axis of rotation 14. In the area between the bearing pin 12 and the indent 39 a bottom bore 40, open towards the indent 39 and thus towards the back 37 of the locking lever 23, is provided in the switching member 11. In this bottom bore a helical spring 36 is provided. Thus this helical spring is, in contrast to the leaf spring 35 with respect to the embodiment according to FIG. 1, arranged on the side of the locking lever 23 facing the bearing point of the switching member 11. The helical spring 36 is supported on the bottom of the bottom bore 40 and pushes a pin 41 as an intermediate member against the back 37 of the locking lever 23. The pin 41 has at least one rib 42 for receipt of spring 36. Pin 41 can be movably guided in a longitudinal direction in the bottom bore 40. The face 43 has the same general configuration as the back 37 of the locking lever 23 and extensively lies on the back 37 of the locking lever 23. The longitudinal direction of the bottom bore 40 is radially running to the axis 14 of the switching member 11 so that the helical spring 36 is in a plane radial to the axis of rotation 14, which extends in radial direction to the axis of rotation 14. As illustrated in FIG. 2 such an arrangement advantageously provides a narrow switching member. A leaf spring also could be arranged in such a way that it lies in a plane that is substantially radial to the axis of rotation 14 of the switching member 11. This would be the case, for instance, if a leaf spring extends substantially in a perpendicular direction to the drawing plane according to FIG. 1.

One end of the springs 35 and 36 of the two embodiments engage the locking lever 23 and indirectly on the locking cam 22 and thus on the switching member 11. The other end is directly supported on the switching member 11. Thus, the springs 35 and 36 are only effective within one component, namely within the switching member 11 so that they do not press onto the bearing pin 12 of the switching member 11 and the corresponding receivers in the housing 11. Therefore, such a support of the resilient means pressing onto the locking lever nevertheless is of an advantage, if the locking cam is on the locking lever and the switch cam is on the switching member.

Furthermore, compared to FIG. 1 the embodiment according to the FIGS. 2 and 3 is advantageous due to the switch cam lying outside on the locking lever with respect to the bearing point of the biasing means and locking cam. Assuming the same swiveling angle of the switching member, the arc of the switch cam is bigger than in the case of the switch cam lying inside. Thus at least the individual switch cam, can be located further apart and can be adapted more precisely. On the other hand, smaller locking steps can be achieved, with the switch cam lying inside.

What is claimed is:

1. An electric steering column switch for motor vehicles including an actuator mechanism, the improvement comprising:
   a switching member pivotally mounted for pivotal movement about a pivot axis between predetermined positions, said switching member having a locking cam thereon;
   a locking lever having switch cams thereon, said locking lever being mounted for swivelling movement with respect to said switching member and said locking cam, said locking cam being selectively received within said switching cams corresponding to said predetermined positions;
   a biasing means biased against said locking lever urging said lever in the direction of said locking cam, said biasing means being mounted upon said switching member such that said biasing means pivots with said switching member and said locking cam;
   whereby said biasing means pivots with said switching member applying consistent generally equal biasing pressure against said locking lever and said adjacent locking cam.

2. The electric steering column switch of claim 1, wherein said locking lever swivels about a swivelling axis, said biasing means acts upon said locking lever at least approximately at the same distance as that of the locking cam from the swivelling axis.

3. The electric steering column switch of claim 1, wherein said locking lever has a back side opposite said switching cams and said biasing means acts upon said backside of said locking lever opposite said locking cam and said respective switching cams.

4. The electric steering column switch of claim 1, wherein said switching cam is on one side of said locking lever facing away from said pivot axis of said switching member with said biasing means mounted upon said switching member engaging the other side of said locking lever such that said locking lever sandwiches between said locking cam and biasing means.

5. The electric steering column switch of claim 1, wherein said biasing means applies the same force to said locking lever at at least two positions of said switching lever.

6. The electric steering column switch of claim 1, wherein upon pivoting said switching member between at least two adjacent positions, said biasing means acts upon said locking lever at points corresponding to said at least two adjacent positions, said points being on an arc the axis of which is generally the point axis of said switching member.

7. The electric steering column switch of claim 1, wherein said locking lever comprises a cylindrical contact area for contact by said biasing means.

8. The electric steering column switch of claim 1, wherein said biasing means is a coil spring.

9. The electric steering column switch of claim 1, wherein said biasing means is a leaf spring.

10. An electric steering column switch for motor vehicles including an actuation mechanism, the improvement comprising:
    a switching member pivotally mounted for pivotal movement about a pivot axis between predetermined positions, said switching member having a locking cam thereon;
    a locking lever having switching cams thereon, said locking lever being mounted for swivelling movement with respect to said switching member and said locking cam, said locking cam being selectively received within said switching cams corresponding to said predetermined positions;
    a biasing means biased against said locking lever urging said lever in the direction of said locking cam, said biasing means being mounted upon said switching member such that said biasing means pivots with said switching member and said locking cam;
    said biasing means applying generally the same force to said locking lever at at least two positions of said switching lever
    whereby said biasing means pivots with said switching member applying consistent generally equal biasing pressure against said locking lever and said adjacent locking cam.

11. The electric steering column switch of claim 10, wherein said locking lever swivels about a swivelling axis and said biasing means acts upon said locking lever at least approximately at the same distance as that of the locking cam from the swivelling axis.

12. The electric steering column switch of claim 10, wherein said locking lever has a back side opposite said switching cams and said biasing means acts upon said backside of said locking lever opposite said locking cam and said respective switching cams.

13. The electric steering column switch of claim 10, wherein said switching cam is on one side of said locking lever facing away from said pivot axis of said switching member with said biasing means mounted upon said switching member engaging the other side of said locking lever such that said locking lever sandwiches between said locking cam and biasing means.

14. The electric steering column switch of claim 10, wherein upon pivoting said switching member between at least two adjacent Positions, said biasing means acts upon said locking lever at Points corresponding to said at least two adjacent positions, said points being on an arc the axis of which is the pivot axis of said switching member.

15. The electric steering column switch of claim 14, wherein said locking lever comprises a cylindrical contact area for contact by said biasing means.

16. The electric steering column switch of claim 10, wherein said biasing means is a coil spring.

17. The electric steering column switch of claim 10, wherein said biasing means is a leaf spring.

* * * * *